A. S. KUX.
SHOCK ABSORBING DEVICE.
APPLICATION FILED DEC. 18, 1915.
1,293,809. Patented Feb. 11, 1919.
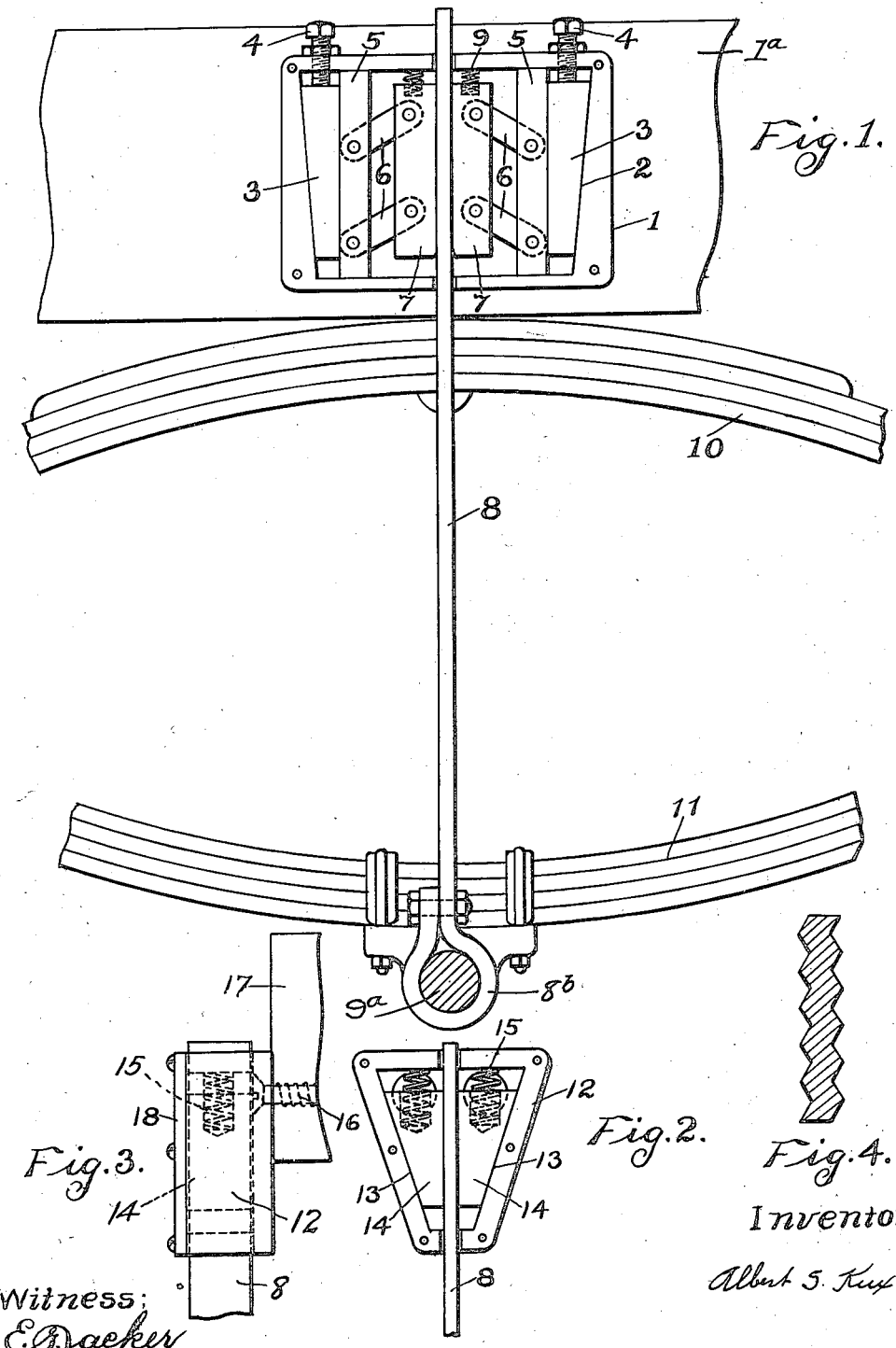
Inventor:
Albert S. Kux
Witness:
E. Backer
B. C. Rinehart

UNITED STATES PATENT OFFICE.

ALBERT S. KUX, OF CHICAGO, ILLINOIS.

SHOCK-ABSORBING DEVICE.

1,293,809.                     Specification of Letters Patent.      Patented Feb. 11, 1919.

Application filed December 13, 1915. Serial No. 68,030.

*To all whom it may concern:*

Be it known that I, ALBERT S. KUX, a citizen of the United States, residing at Chicago, in the county of Cook and State of Illinois, have invented a certain new and useful Improvement in Shock-Absorbing Devices, of which the following is a specification.

My invention relates to shock-absorbing devices, and refers particularly to such devices as used on vehicles, such as automobiles.

I am aware that it is old and well known to employ shock-absorbing devices between two relatively movable parts of a vehicle (such as the body and axle, or other part of the running gear) so that the rebound of the vehicle springs from the shock is eased or given a braking effect by means of the shock-absorbing device. I am also aware that it is old to provide such devices in which the relative movement of the two parts or members is free and unobstructed in one direction, as, for example, when the two parts are moved toward each other, while it is retarded in the opposite direction, as the parts move away from each other. As used in the past, however, such devices have been complicated and cumbersome and impractical in actual use.

It is the object of my invention to produce a shock-absorbing device which will accomplish the results obtained by shock-absorbing devices of the prior art but by means of much simpler, more efficient, and more economical mechanism.

It is a further object of my invention to provide means for quickly and easily adjusting the retarding or braking action of the shock-absorbing device when the two relatively movable parts to which it is attached move in one direction with respect to each other, while no resistance is offered to the relative movement of these parts when they move in the opposite direction with respect to each other.

Stated in general terms, the mechanism used in connection with my invention consists of a brake member which is attached to one of the relatively movable parts of the vehicle, as, for example, the body thereof, and a strap member which engages the other relatively movable part of the vehicle, such as the axle, this strap member being preferably in the form of a flat rod (preferably longitudinally corrugated) engaged on its opposite faces by a pair of brake shoes which are preferably adjustable and are adapted to allow free movement of the strap member in one direction while retarding its movement in the opposite direction.

These and other advantages of my invention will be more readily apparent by reference to the accompanying drawings, in which—

Figure 1 is a side elevation and partial sectional view through a portion of a vehicle, showing my shock-absorbing device as applied thereto, the side cover of the brake-shoe casing being removed;

Fig. 2 is a side elevation of a modified form of brake mechanism, the side cover being removed from the brake-shoe casing;

Fig. 3 is an end elevation of the modified form of device shown in Fig. 2 with the brake-shoe casing cover applied thereto, and showing means for attaching said casing to a vehicle body; and, Fig. 4 is a horizontal section through a preferred form of strap member.

As illustrated in Fig. 1, the casing 1 is in the form of a square box, which is suitably fastened to the vehicle body 1ª. The inner surfaces 2 of the ends of the casing 1 are inclined, and are engaged by correspondingly inclined surfaces of the wedges 3, which may be moved upwardly and downwardly by means of the screws 4 passing through the top of the casing 1. The inner surface of each of the wedges 3 engages a follower plate 5, each of the follower plates 5 having pivotally connected thereto a pair of links 6, which, in turn, are pivotally connected with the brake shoes 7 engaging opposite faces of the strap member 8, which passes through suitable apertures in the top and bottom of the casing 1. Each of the brake shoes 7 has a spring 9 between its upper end and the inner surface of the top of the casing 1, so that the brake-shoes 7 are at all times held in engagement with the strap member 8.

The strap member 8 is preferably in the form of a flat strip (which may also preferably be corrugated longitudinally, as shown by the strap 8ª of Fig. 4, to increase the friction surface between said strap and correspondingly corrugated brake-shoes) and at its lower end is provided with the eye or loop 8ᵇ, which engages the axle 9ª, or other suitable portion of the running gear of the vehicle, it being understood that the usual springs 10 and 11 are provided between the vehicle body 1ª and the axle 9ª. I prefer to mount the casing 1 on the vehicle body 1ª in such manner that it is enabled to swing slightly to compensate for relative longitudinal movement between the vehicle body and the running gear, and thus prevent binding of the strap member 8 in the casing 1. To further the same object, I also prefer to make the strap member 8, which is of suitable material to provide the requisite friction with the brake-shoes 7, of slightly flexible material.

The operation of the device which I have described may now be readily understood. When the vehicle wheel hits an obstruction in the road the axle 9ª is forced upwardly toward the vehicle body 1ª and against the tension of the springs 10 and 11. Under these conditions the strap member 8 moves freely upwardly between the pair of brake-shoes 7, 7, the latter being held in light engagement with the surfaces of the strap member 8 by means of the springs 9. When the rebound starts and the relative distance between the vehicle body 1ª and the axle 9ª begins to increase, the brake-shoes 7 closely engage the opposite surfaces of the strap member 8 since the links 6 are downwardly inclined from the brake-shoes 7 to the followers 5, and the upward movement of the vehicle body 1ª, which is caused by the return action of the springs 10 and 11 to their normal position, is thereby retarded. This retarding action may be readily regulated by upward or downward movement of the wedges 3, which cause corresponding lateral movement of the followers 5. Similarly, if the wheel of the vehicle suddenly goes into a depression in the road, the tendency to increase the distance between the axle 9ª and the vehicle body 1ª will be retarded, and the vehicle body will tend to be carried downwardly with the axle, after which the parts will be freely returned to their normal positions by the action of the springs 10 and 11 and the free upward passage of the strap member 8 between the brake-shoes 7, 7. The friction between the strap 8 and the brake-shoes 7 when the latter exercise their retarding effect, may be regulated, as previously described, by adjustment of the position of the wedge members 3.

It will be apparent that by means of the simple and economical mechanism which I have just described the wear and tear on a vehicle are greatly decreased and the ease and smoothness of riding are greatly increased.

In Figs. 2 and 3 I have shown a modified form of construction in which the casing 12 is made with inclined end surfaces 13, which are directly engaged by correspondingly inclined surfaces of the wedge-shaped brake-shoes 14, the inner surfaces of which engage the strap member 8. These brake-shoes are provided at their upper ends with the springs 15, which engage the inner surface of the top of the casing 12, so that they are at all times held in engagement with the strap member 8. As best shown in Fig. 3, the casing 12 may be attached to the vehicle body 17 by means of a screw 16. The casing 12 is provided with a cover 18, which is held in position by screws or other suitable means.

It will be evident that in the modified form of construction shown in Figs. 2 and 3 the apparatus operates on the same principle as that shown in Fig. 1, but no means are provided in this modified form for adjusting the friction between the brake-shoes 14 and the strap 8.

It will be apparent to those skilled in the art that many changes could be made in the detailed construction of the various parts which I have described without departing from the spirit or scope of my invention, as defined in the appended claims.

I claim:

1. A shock-absorbing device, comprising, in combination with a pair of relatively movable members, a casing attached to one of said members, a pair of brake-shoes within said casing, a substantially flat strap attached to the other of said members and engaged on opposite surfaces by said brake-shoes, a pair of followers within said casing, means for adjusting the position of said followers toward and away from said brake-shoes, and links connecting said followers with said brake-shoes, whereby said strap may be freely moved between said brake-shoes when said members are relatively moved in one direction and the movement of said strap between said brake-shoes will be retarded when said members are relatively moved in the opposite direction.

2. A shock-absorbing device, comprising the combination of a casing adapted to be attached to a vehicle frame, a substantially flat strap adapted to be attached to the vehicle running gear, a pair of brake-shoes within said casing and adapted to engage opposite surfaces of said strap, a pair of followers adapted for lateral movement within said casing, a wedge engaging each of said followers, means for adjusting the position of each of said wedges, whereby the lateral position of the follower which is engaged by said wedge will be correspondingly adjusted, and a pair of links extending between each of said followers and one of said brake-shoes, said links being disposed in inclined positions when said strap is interposed between said brake-shoes, whereby said strap may be freely moved between said brake-shoes in one direction while its movement is retarded when said strap is moved in the opposite direction.

ALBERT S. KUX.

Witnesses:
B. L. McLEAN,
SAMUEL FRIEDRIC.